UNITED STATES PATENT OFFICE.

FRANKLIN D. HAGAR, OF BOSTON, MASSACHUSETTS, ASSIGNOR TO LIQUID WALL PAPER COMPANY, OF BOSTON, MASSACHUSETTS, A CORPORATION OF MASSACHUSETTS.

WALL-COATING COMPOSITION.

No. 833,162.     Specification of Letters Patent.     Patented Oct. 16, 1906.

Application filed December 11, 1905. Serial No. 291,198.

*To all whom it may concern:*

Be it known that I, FRANKLIN D. HAGAR, a citizen of the United States, residing at Boston, in the county of Suffolk and State of Massachusetts, have invented certain new and useful Improvements in Wall-Coating Compositions, of which the following is a specification, reference being had therein to the accompanying drawings.

This invention has for its object the production of a new composition for wall and ceiling coverings by bringing together certain substances well known in chemistry, as hereinafter described, the substances when combined forming a wall-coating composition in the form of liquid wall-paper so that after the same has been applied to and dried upon the wall it has the appearance of wall-paper.

I am aware that flour, alum, flock, and water have been used together to form a wall-coating composition, as shown in United States Letters Patent No. 796,604; but I am not aware that any of the other ingredients have been used together for this purpose or for any other purpose.

My composition consists of the following ingredients combined in the proportions stated—viz., gum-tragacanth, six gills; chromic oxid, (chrome-green,) ($Cr_2O_3$,) nine ounces; chromate of lead, (chrome-yellow,) ($PbCrO_4$,) nine ounces; flock, two pounds; meal, nine ounces; bran, three ounces; sawdust, three ounces; straw, three ounces; bronze powder, two ounces; whiting, one pound; rosin, six gills; mica, three pounds; pulp, two pounds; ground silk, one pound; varnish, three table-spoonfuls; pulverized cork, three ounces; formaldehyde, ($H_2CO$,) three drops; glue, two table-spoonfuls; brown sugar, six ounces; water, ($H_2O$,) one gallon.

In carrying out my invention I first take the gum-tragacanth, chromic oxid, chromate of lead, flock, whiting, pulp, and ground silk and mix the same with a little water. Then I take the meal (rye or oats will be found preferable) and mix with the bran, sawdust, straw, bronze, rosin, mica, varnish, pulverized cork, glue, and brown sugar. If desired, boiling water may be applied, and the same should be thoroughly mingled by agitation, after which, if the same is to be kept for several days before using, apply the formaldehyde to this paste and thoroughly stir.

The combination of these ingredients forms adhesive mixtures suitable to be applied upon the walls direct and can be properly termed a "liquid wall-paper," as the same is applied to the walls or ceilings in a liquid or paste form with a brush or trowel and when dried forms a wall-paper free from seams. When properly mixed and applied it will not fade or crack, no seams, laps, or joints will show, and it can be quickly repaired without showing the repair-work.

The combination can be ejected or squirted upon the wall or ceiling or can be hand-pressed upon or applied by machinery, and, if desired, the flock need not be combined with the other ingredients, but may be blown upon the wall after the application of the combination of other ingredients.

A great many different effects can be obtained by the different combinations mentioned in this application by the different methods of application to wall as aforementioned, and smooth or rough or silky effects can be obtained. The paste mixture is very desirable for design, free-hand, relief, tile, or stucco work, and it is free from smell, non-poisonous, and non-combustible.

What I claim, and desire to secure by Letters Patent of the United States, is—

1. The herein-described composition of matter, containing gum-tragacanth, chrome, and flock, substantially as described and for the purpose of making a wall-covering.

2. The herein-described composition of matter, containing water, gum-tragacanth, chromic oxid, and flock, substantially as described and for the purposes specified.

3. The herein-described composition of matter, containing water, gum-tragacanth, chromate of lead, and flock, substantially as described and for the purposes specified.

4. The herein-described composition of matter, containing gum-tragacanth, chromic oxid and sawdust, substantially as described and for the purpose of producing a stippling background.

5. The herein-described composition of matter, containing gum-tragacanth, chromate of lead and sawdust, substantially as described and for the purpose of producing a stippling background.

6. The herein-described composition of matter, containing water, gum-tragacanth, chrome and sawdust, substantially as described and for the purposes specified.

7. The herein-described composition of matter, containing gum-tragacanth, chromic oxid, meal, and sawdust, substantially as described and for the purposes specified.

8. The herein-described composition of matter, containing gum-tragacanth, chromate of lead, meal and sawdust, substantially as described and for the purposes specified.

9. The herein-described composition of matter, containing gum-tragacanth, chrome, water, meal and sawdust, substantially as described and for the purposes specified.

10. The herein-described composition of matter, containing gum-tragacanth, chromic oxid and straw, substantially as described and for the purposes specified.

11. The herein-described composition of matter, containing gum-tragacanth, chromate of lead and straw, substantially as described and for the purposes specified.

12. The herein-described composition of matter, containing water, straw, chrome, and gum-tragacanth, substantially as described and for the purposes specified.

13. The herein-described composition of matter, containing gum-tragacanth, chromic oxid and bronze-powder, substantially as described and for the purpose of producing an artistic wall-covering.

14. The herein-described composition of matter, containing gum-tragacanth, chromate of lead and bronze-powder, substantially as described and for the purpose of producing an artistic wall-covering.

15. The herein-described composition of matter, containing water, gum-tragacanth, chrome, and bronze-powder, substantially as described and for the purposes specified.

16. The herein-described composition of matter, containing gum-tragacanth, flock, and bronze-powder, substantially as described and for the purpose of obtaining a wall-coating composition with a transparent effect.

17. The herein-described composition of matter, containing water, gum-tragacanth, flock, and bronze-powder, substantially as described and for the purpose of obtaining a wall-coating composition with a transparent effect.

18. The herein-described composition of matter, containing gum-tragacanth, flock, meal, and bronze-powder, substantially as described and for the purposes specified.

19. The herein-described composition of matter, containing gum-tragacanth, flock, bran, and bronze-powder, substantially as described and for the purposes specified.

20. The herein-described composition of matter, containing gum-tragacanth, flock, sawdust, and bronze-powder, substantially as described and for the purposes specified.

21. The herein-described composition of matter, containing gum-tragacanth, flock, straw, and bronze-powder, substantially as described and for the purposes specified.

22. The herein-described composition of matter, containing gum-tragacanth, flock, chrome, and bronze-powder, substantially as described and for the purposes specified.

23. The herein-described composition of matter, containing water, flock, chrome, and bronze-powder, substantially as described and for the purposes specified.

24. The herein-described composition of matter, containing gum-tragacanth, flock, water, chrome, and bronze-powder, substantially as described and for the purposes specified.

25. The herein-described composition of matter, containing gum-tragacanth, flock, meal, bran, sawdust, straw, and bronze-powder, substantially as described and for the purposes specified.

26. The herein-described composition of matter, containing water, gum-tragacanth, bronze-powder, flock, meal, and sawdust, substantially as described and for the purposes specified.

27. The herein-described composition of matter, containing gum-tragacanth, chromic oxid, flock, and whiting, substantially as described and for the purposes specified.

28. The herein-described composition of matter, containing water, gum-tragacanth, chrome, flock, and whiting, substantially as described and for the purposes specified.

29. The herein-described composition of matter, containing water, rosin, flock, and chrome, substantially as described and for the purposes specified.

30. The herein-described composition of matter, containing water, rosin, chromic oxid, and meal, substantially as described and for the purposes specified.

31. The herein-described composition of matter, containing water, rosin, chromate of lead, and meal, substantially as described and for the purposes specified.

32. The herein-described composition of matter, containing glue, rosin, and flock, substantially as described and for the purposes specified.

33. The herein-described composition of matter, containing rosin, water, flock, and whiting, substantially as described and for the purposes specified.

34. The herein-described composition of matter, containing gum-tragacanth, flock and mica, substantially as described and for the purposes specified.

35. The herein-described composition of matter, containing water, glue, flock, and mica, substantially as described and for the purposes specified.

36. The herein-described composition of matter, containing gum-tragacanth, mica, chrome and bran, substantially as described and for the purposes specified.

37. The herein-described composition of matter, containing gum-tragacanth, chrome, mica, meal, bran, sawdust, and straw, substantially as described and for the purposes specified.

38. The herein-described composition of matter, containing gum-tragacanth, bronze-powder, and mica, substantially as described and for the purposes specified.

39. The herein-described composition of matter, containing gum-tragacanth, bronze-powder, mica and meal, substantially as described and for the purposes specified.

40. The herein-described composition of matter, containing gum-tragacanth, mica and ground silk, substantially as described and for the purposes specified.

41. The herein-described composition of matter, containing gum-tragacanth, chrome, flock and ground silk, substantially as described and for the purposes specified.

42. The herein-described composition of matter, containing gum-tragacanth, varnish and flock, substantially as described and for the purposes specified.

43. The herein-described composition of matter, containing gum-tragacanth, varnish and meal, substantially as described and for the purposes specified.

44. The herein-described composition of matter, containing varnish, chrome, and meal, substantially as described and for the purposes specified.

45. The herein-described composition of matter, containing varnish, chrome, and sawdust, substantially as described and for the purposes specified.

46. The herein-described composition of matter, containing gum-tragacanth, varnish, chrome, ground silk, and pulverized cork, substantially as described and for the purposes specified.

47. The herein-described composition of matter, containing gum-tragacanth, chrome, meal, rosin, glue, brown sugar, and sawdust, substantially as described and for the purposes specified.

48. The herein-described composition of matter, containing gum-tragacanth, chrome, meal and formaldehyde, substantially as described and for the purposes specified.

49. The herein-described composition of matter, containing gum-tragacanth, flock, and formaldehyde, substantially as described and for the purposes specified.

50. The herein-described composition of matter, containing gum-tragacanth, chrome, sawdust, and formaldehyde, substantially as described and for the purposes specified.

51. The herein-described composition of matter, containing gum-tragacanth, chrome, mica, and formaldehyde, substantially as described and for the purposes specified.

52. The herein-described composition of matter, containing gum-tragacanth, chrome, straw, and formaldehyde, substantially as described and for the purposes specified.

53. The herein-described composition of matter, containing water, chrome, meal, sawdust, and formaldehyde, substantially as described and for the purposes specified.

54. The herein-described composition of matter, containing gum-tragacanth, chrome, flock, bronze-powder, rosin, varnish, and brown sugar, substantially as described and for the purposes specified.

55. The herein-described composition of matter, containing gum-tragacanth, chrome, meal, bran, sawdust, straw, rosin, mica, ground silk, varnish, pulverized cork, glue, and brown sugar, substantially as described and for the purposes specified.

56. The herein-described composition of matter, containing gum-tragacanth, chromic, oxid, chromate of lead, flock, meal, bran, sawdust, straw, bronze-powder, whiting, rosin, mica, pulp, ground silk, varnish, pulverized cork, and glue, substantially as described and for the purposes specified.

57. The herein-described composition of matter, containing gum-tragacanth, chrome, pulp, and formaldehyde, substantially as described and for the purposes specified.

58. The herein-described composition of matter, containing varnish, pulp, chrome, and formaldehyde, substantially as described and for the purposes specified.

59. The herein-described composition of matter, containing rosin, gum-tragacanth, pulp, and chrome, substantially as described and for the purposes specified.

60. The herein-described composition of matter for mixing with flock in forming a liquid wall-paper, consisting substantially of the following ingredients, gum-tragacanth six gills, chromic oxid nine ounces, chromate of lead nine ounces, meal nine ounces, bran three ounces, sawdust three ounces, straw three ounces, bronze-powder two ounces, whiting, one pound, rosin six gills, mica three pounds, pulp two pounds, ground silk one pound, varnish three table-spoonfuls, pulverized cork three ounces, glue two table-spoonfuls, brown sugar six ounces, formaldehyde three drops.

In testimony whereof I affix my signature in presence of two witnesses.

FRANKLIN D. HAGAR.

Witnesses:
CHARLES F. A. SMITH,
GEO. H. WOLCOTT.